United States Patent [19]

Dinsmore et al.

[11] 4,343,629

[45] Aug. 10, 1982

[54] PROCESS AND APPARATUS FOR RECOVERING HYDROCARBONS FROM AIR-HYDROCARBON VAPOR MIXTURES

[75] Inventors: Harold L. Dinsmore; Robert E. Schwartz; Willard N. Tuttle, all of Tulsa, Okla.

[73] Assignee: John Zink Company, Tulsa, Okla.

[21] Appl. No.: 231,917

[22] Filed: Feb. 5, 1981

[51] Int. Cl.³ ............... B01D 53/04; B01D 53/14
[52] U.S. Cl. ........................... 55/28; 55/48; 55/58; 55/88; 55/89; 55/180; 55/208; 55/387
[58] Field of Search ............... 55/28, 48, 58, 62, 74, 55/88, 89, 179, 180, 208, 387

[56] References Cited

U.S. PATENT DOCUMENTS

| | | | |
|---|---|---|---|
| 1,566,944 | 12/1925 | Wilson | 55/62 |
| 1,661,149 | 2/1928 | Barnebey | 55/58 |
| 1,934,075 | 11/1933 | Lewis | 55/58 |
| 2,157,565 | 5/1939 | Pexton et al. | 55/179 |
| 3,445,990 | 5/1969 | Hays et al. | 55/58 |
| 3,455,089 | 7/1969 | Mattia | 55/62 |
| 3,543,484 | 12/1970 | Davis | 55/387 |
| 3,768,232 | 10/1973 | Farber et al. | 55/58 |
| 3,776,283 | 12/1973 | Kramer et al. | 55/387 X |
| 3,867,111 | 2/1975 | Knowles | 55/58 X |
| 3,897,193 | 7/1975 | Kattan et al. | 55/387 X |
| 3,979,175 | 9/1976 | Kattan et al. | 55/58 X |
| 4,056,369 | 11/1977 | Quackenbush | 55/58 |
| 4,058,147 | 11/1977 | Stary et al. | 55/88 X |
| 4,066,423 | 1/1978 | McGill et al. | 55/48 |
| 4,165,972 | 8/1979 | Iles et al. | 55/208 X |
| 4,261,716 | 4/1981 | Schwartz et al. | 55/179 X |
| 4,276,058 | 6/1981 | Dinsmore | 55/58 X |

Primary Examiner—Robert H. Spitzer
Attorney, Agent, or Firm—C. Clark Dougherty, Jr.

[57] ABSTRACT

A process and apparatus for recovering hydrocarbons from an air-hydrocarbon vapor mixture such as the mixture of air and vaporized light hydrocarbon compounds expelled as a result of loading gasoline or the like into storage tanks, tank cars and tank trucks. The air-hydrocarbon vapor mixture is caused to flow through a bed of solid adsorbent whereby the hydrocarbons ar removed from the mixture and a residue gas stream comprised of substantially hydrocarbon-free air is produced. The substantialy hydrocarbon-free air is vented to the atmosphere and while the first bed is removing hydrocarbons from the air-hydrocarbon vapor mixture, a second bed of solid adsorbent having hydrocarbons adsorbed thereon is simultaneously regenerated by evacuating the bed with vacuum pumping and the air-hydrocarbon vapor mixture produced in the regeneration of the bed is contacted with a liquid absorbent whereby a major portion of the hydrocarbons are absorbed therefrom and recovered. The beds of solid adsorbent are cooled, at least while the air-hydrocarbon vapor mixture is flowing therethrough and hydrocarbons are being adsorbed on the bed, to prevent the beds from overheating due to side exothermic reactions of hydrocarbons and/or impurities contained in the air-hydrocarbon vapor mixture with air and/or the solid adsorbent. Apparatus for carrying out the process of the present invention is also provided.

19 Claims, 1 Drawing Figure

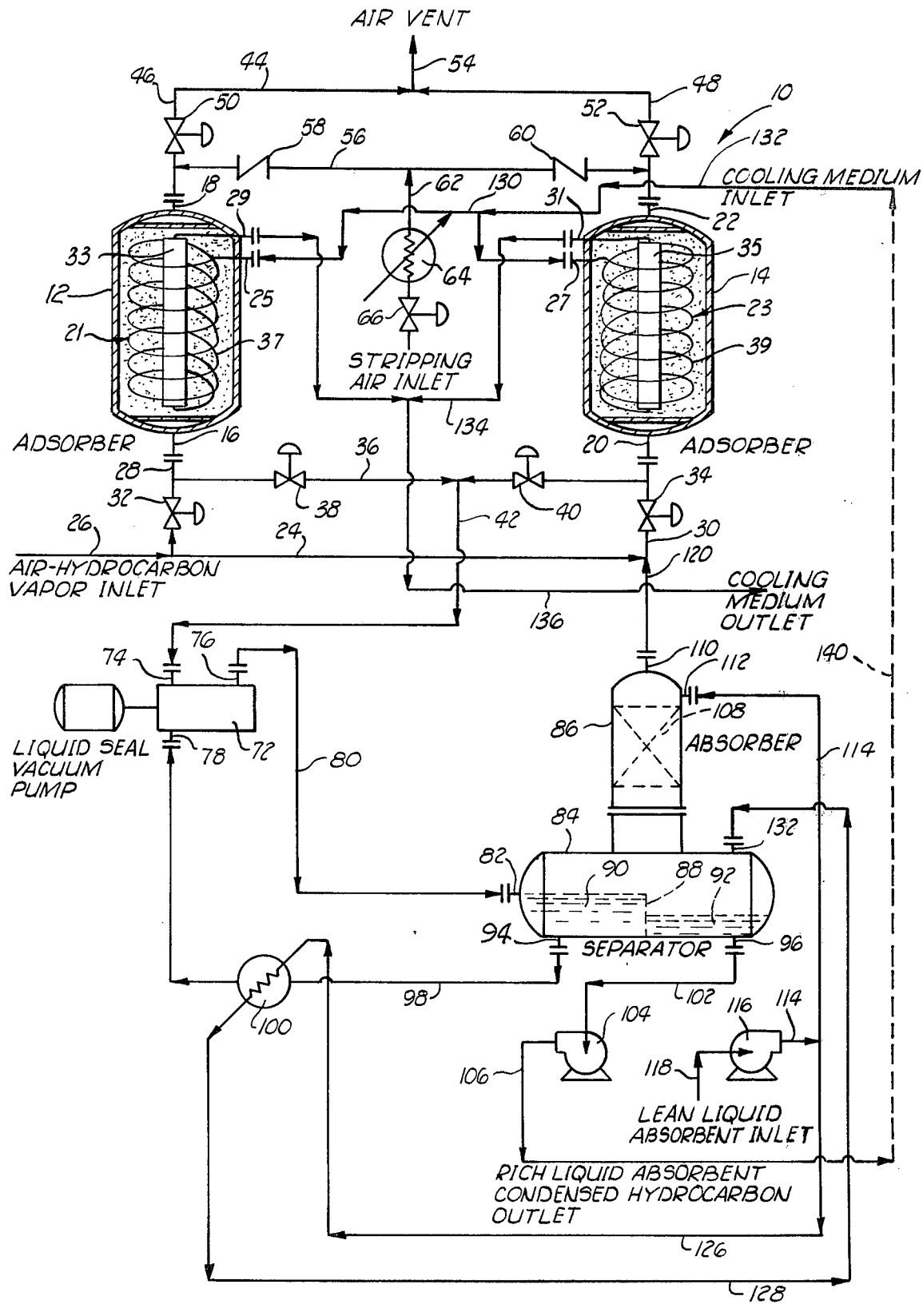

PROCESS AND APPARATUS FOR RECOVERING HYDROCARBONS FROM AIR-HYDROCARBON VAPOR MIXTURES

BACKGROUND OF THE INVENTION

1. Field of the Invention

The present invention relates to a process and apparatus for recovering hydrocarbons from air-hydrocarbon vapor mixtures, and more particularly, but not by way of limitation, to an improved process and apparatus for recovering vaporized gasoline light ends and the like from a mixture thereof with air expelled from tank cars, trucks and the like.

2. Description of the Prior Art

In handling multi-component hydrocarbon liquids such as gasoline, kerosene and the like, air-hydrocarbon vapor mixtures are readily produced which cannot be vented directly to the atmosphere due to the resulting pollution of the environment and fire and/or explosion hazard. Consequently, a variety of processes and apparatus have been developed and used for removing hydrocarbon vapors from such air-hydrocarbon vapor mixtures whereby the remaining air can be safety vented to the atmosphere. The removed hydrocarbons are generally liquefied and recombined with hydrocarbon liquids from which they were vaporized thereby making the recovery economically advantageous.

A process for the recovery of light mixed hydrocarbon vapors from an air-hydrocarbon mixture expelled as a result of storage breathing or loading of vented hydrocarbon vessels is described in U.S. Pat. No. 4,066,423. In accordance with such process, the air-hydrocarbon vapor mixture from which hydrocarbons are to be removed and recovered is passed through a bed of solid adsorbent having an affinity for hydrocarbons. As the mixture passes through the bed, a major portion of the hydrocarbons contained in the mixture are adsorbed on the bed and a residue gas stream is produced which is comprised of substantially hydrocarbon-free air. The hydrocarbon-rich air-hydrocarbon mixture produced as a result of the regeneration of the bed is contacted with a liquid absorbent whereby hydrocarbons are removed therefrom and the residue gas stream from the absorption step is recycled to the bed through which the inlet air-hydrocarbon mixture is flowing. In accordance with the teachings of U.S. Pat. No. 4,066,423, the liquid absorbent utilized is liquid hydrocarbons condensed from the air-hydrocarbon vapor mixture produced in the evacuation regeneration step. More specifically, the hydrocarbon-rich air-hydrocarbon vapor mixture is cooled whereby portions of the hydrocarbons are condensed and such condensed hydrocarbons are circulated into contact with the remaining air-hydrocarbon vapor mixture whereby hydrocarbon vapors are absorbed by the liquids. The use of hydrocarbons which are condensed from the hydrocarbon-rich air-hydrocarbon vapor mixture to contact the remaining air-hydrocarbon vapor mixture results in the inefficient absorption of hydrocarbons from the remaining air-hydrocarbon vapor mixture. Numerous other processes and apparatus for recovering hydrocarbons from air-hydrocarbon vapor mixtures or otherwise treating said mixtures are disclosed in U.S. Pat. Nos. 3,897,193; 3,768,232; 3,867,111; 3,455,089; 3,543,484; and 3,776,283.

A problem which has not been addressed or solved in any of the prior art processes or apparatus is the overheating of the beds of solid adsorbent due to the reaction of hydrocarbons contained in the inlet mixture of air and hydrocarbons with air. It has been found that beds of solid adsorbent through which air-hydrocarbon mixtures are flowed for the purpose of adsorbing and removing the hydrocarbons from the mixture can reach conditions whereby runaway heating of the beds takes place bringing about an extremely dangerous condition, i.e., a condition whereby the air-hydrocarbon mixtures within the beds as well as the solid adsorbent itself can auto-ignite.

The runaway overheating of the beds of solid adsorbent is most prone to take place in applications wherein large adsorbent beds are used, high ambient temperatures exist, and where the air-hydrocarbon vapor mixtures being processed are mixtures expelled from the loading of vented hydrocarbon vessels such as tank cars, tank trucks, etc. From these vessels hydrocarbon concentrations in the air-hydrocarbon vapor mixture are high and may contain other hydrocarbon impurities besides those for which the processing system was designed due to previously hauled substances. In addition, the nature of this service requires the adsorption beds to be operated at very low superficial vapor velocities which inhibit heat dissipation. The combination of the heat released by the adsorption of hydrocarbons, high initial bed temperatures, exothermic hydrocarbon reactions with air, and hindrances to heat dissipation caused by large adsorption vessels and low vapor velocities has resulted in accelerated heating of the beds, i.e., as the temperature of the beds increases greater quantities of materials react causing the temperature to increase at an accelerated rate and rapidly reach an overheated and extremely dangerous condition. In addition, the overheating of the beds of solid adsorbent can severely reduce the efficiency and prevent proper operation of apparatus of which the beds are a part.

By the present invention an improved process is provided which prevents overheating of the beds of solid adsorbent and which utilizes a stream of liquid from which the hydrocarbon vapors originated to absorb and recover the removed hydrocarbons.

SUMMARY OF THE INVENTION

A process for recovering hydrocarbons from an inlet air-hydrocarbon vapor mixture comprising flowing the inlet mixture through a first bed of solid adsorbent whereby hydrocarbons are adsorbed on the bed and a residue gas stream comprised of substantially hydrocarbon-free air which is vented to the atmosphere is produced. A second bed of solid adsorbent having hydrocarbons adsorbed thereon is evacuated and thereby regenerated by vacuum pumping whereby hydrocarbons are desorbed from the bed and a hydrocarbon-rich air-hydrocarbon mixture is produced. The hydrocarbon-rich air-hydrocarbon mixture is contacted with a liquid absorbent whereby a major portion of the hydrocarbons are removed therefrom and a residue gas stream comprised of air and a minor portion of hydrocarbons is produced. The residue gas stream is combined with the inlet air-hydrocarbon mixture whereby it flows through the first adsorbent bed and hydrocarbons are removed therefrom. The flow patterns of the inlet air-hydrocarbon mixture and the bed of solid adsorbent being evacuated are periodically changed whereby when the bed through which the inlet air-hydrocarbon mixture is flowing becomes loaded with adsorbed hydrocarbons, the inlet air-hydrocarbon mixture is caused to flow through the bed which has just been regenerated. The first and second beds of solid adsorbent are cooled by passing a cooling medium in heat exchange relationship therewith, at least while the inlet air-hydrocarbon vapor mixture is flowing therethrough, to prevent the beds from overheating. Apparatus for carrying out the process of this invention is also provided.

It is, therefore, a general object of the present invention to provide an improved process and apparatus for recovering hydrocarbons from air-hydrocarbon vapor mixtures.

A further object of the present invention is the provision of a process and apparatus whereby hydrocarbons contained in an air-hydrocarbon mixture are adsorbed on a bed of solid adsorbent and the bed is prevented from overheating due to the reaction of hydrocarbons contained therein with air.

Yet a further object of the present invention is the provision of apparatus for recovering hydrocarbons from an air-hydrocarbon vapor mixture which is relatively inexpensive to install and operate as compared to prior apparatus.

Other and further objects, features and advantages of the present invention will be readily apparent to those skilled in the art upon a reading of the description of preferred embodiments which follows when taken in conjunction with the accompanying drawing.

BRIEF DESCRIPTION OF THE DRAWING

In the drawing forming a part of this disclosure, apparatus for carrying out the process of this invention is illustrated diagrammatically.

DESCRIPTION OF PREFERRED EMBODIMENTS

Referring to the drawing, apparatus of the present invention is illustrated and generally designated by the numeral 10. The apparatus 10 is comprised of a pair of adsorbers 12 and 14, each of which contains a bed of solid adsorbent through which gases can flow. Each of the adsorbers 12 and 14 are closed vessels and include connections positioned on opposite sides of the beds of adsorbent contained therein. That is, the adsorber 12 includes inlet and outlet connections 16 and 18 and the adsorber 14 includes inlet and outlet connections 20 and 22. While various solid adsorbents having an affinity for hydrocarbons can be utilized in the adsorbers 12 and 14, activated carbon is preferred in that it is particularly suitable for adsorbing light hydrocarbon vapors of the type found in air-hydrocarbon vapor mixtures and for vacuum regeneration.

Each of the adsorbers 12 and 14 includes a heat transfer coil 21 and 23, respectively, disposed therein. The heat transfer coils 21 and 23 include inlet connections 25 and 27, respectively, and outlet connections 29 and 31, respectively, which pass through the sides of the closed vessels 12 and 14. The heat transfer coils 21 and 23 are of a configuration and are positioned within the beds of solid adsorbent contained within the adsorbers 12 and 14 such that heat is readily transferred from the beds of solid adsorbent to a cooling medium flowed through the heat transfer coils. While a great variety of coil configurations can be utilized, a presently preferred configuration includes a central vertically positioned cylinder and a helical coil positioned an intermediate distance outwardly therefrom. More specifically, the heat transfer coils 21 and 23 include centrally positioned cylinders 33 and 35, respectively, the top ends of which are connected to the outlet connections 29 and 31, and the bottom ends of which are connected to vertically positioned helical coils 37 and 39, respectively. The helical coils are in turn connected to the inlet connections 25 and 27, respectively. Thus, cooling medium flowed through the heat transfer coils 21 and 23 passes downwardly through the helical coils 37 and 39 thereof and upwardly through the centrally positioned cylinders 33 and 35 thereof.

An air-hydrocarbon vapor mixture inlet header 24 is provided connected to a conduit 26 which conducts an air-hydrocarbon vapor mixture from a source thereof to the apparatus 10. A pair of conduits 28 and 30 are connected to the header 24 and to the connections 16 and 20 of the adsorbers 12 and 14, respectively. Conventional switching valves 32 and 34 are disposed in the conduits 28 and 30, respectively, and a header 36 is connected to the conduits 28 and 30 at points thereon between the switching valves 32 and 34 and the connections 16 and 20 of the adsorbers 12 and 14. A pair of switching valves 38 and 40 are disposed in the header 36 and a conduit 42 is connected to the header 36 at a point between the switching valves 38 and 40.

A residue gas header 44 is provided, and a pair of conduits 46 and 48 are connected to the header 44 and to the connections 18 and 22 of the adsorbers 12 and 14. Switching valves 50 and 52 are disposed in the conduits 46 and 48, respectively, and a conduit 54 is connected to the header 44 between the valves 50 and 52 for venting residue gas to the atmosphere.

A stripping air header 56 is provided connected to the conduits 46 and 48 at locations thereon between the switching valves 50 and 52 and the connections 18 and 22 of the adsorbers 12 and 14. A pair of check valves 58 and 60 are disposed in the header 56 and a conduit 62 is connected to the header 56 at a point between the valves 58 and 60. An air heater 64 which can take various forms and a switching valve 66 are disposed in the conduit 62. The end of the conduit upstream from the switching valve 66 and the heater 64 is left open to the atmosphere and a conventional air filter (not shown) is generally attached thereto for preventing solid impurities from entering the adsorbers 12 and 14. The open end of the conduit 54 can also include a flame arrestor (not shown).

The conduit 42 connected to the header 36 is connected to the suction connection 74 of a vacuum pump 72. While various types and designs of vacuum pumps can be utilized in accordance with the present invention, a conventional liquid seal vacuum pump, also known as a liquid ring vacuum pump, is preferred in that such a pump is capable of producing a high vacuum and is relatively inexpensive. The vacuum pump utilizes a seal liquid which is circulated through the pump, which keeps the pump cool and cools the gas or gases flowing through the pump. The presence of the seal liquid in the pump precludes any possibility of explosion since the gas cannot approach its auto-ignition temperature nor can sparking occur due to mechanical failure within the pump. The liquid seal pump 72 includes the suction connection 74 to which the conduit 42 is connected, a discharge connection 76 and a seal liquid inlet connection 78. A conduit 80 is connected to the discharge connection 76 of the pump 72 and to an inlet connection 82 of a separator 84. In a preferred embodiment, an absorber 86 is integrally connected to the top of the separator 84, but as will be understood, the absorber 86 and separator 84 can be separate vessels.

The separator 84 is a three-phase separator capable of separating the seal liquid utilized for the pump 72, condensed hydrocarbons and an air-hydrocarbon vapor mixture from each other. Also, in the embodiment illustrated in the drawing, the separator 84 includes a chamber for accumulating separated condensed hydrocarbon liquids and hydrocarbon-rich liquid absorbent entering the separator 84 from the absorber 86 whereby such liquids are removed from the separator 84 in a combined state. More specifically, the separator 84 includes a weir 88 which divides the separator into a forward compartment 90 and a rearward compartment 92. The seal liquid and condensed hydrocarbon liquids entering the separator 84 by way of the inlet connection 82 are separated from the air-hydrocarbon vapor mixture in the forward compartment 90. The seal liquid is heavier than the condensed hydrocarbon liquids and is immiscible therewith, and consequently, the seal liquid accumulates in the bottom of the forward compartment 90 from where it is removed by way of a seal liquid outlet connection 94 attached to the separator 84. Condensed hydrocarbon liquids accumulating in the compartment 90 spill over the top of the weir 88 into the compartment 92. Hydrocarbon-rich liquid absorbent from the absorber 86 enters the compartment 92 by way of the open bottom of the absorber 86 connected to the top of the separator 84 and also accumulates in the compartment 92. The rich liquid absorbent-condensed hydrocarbon liquid mixture is removed from the separator 84 by way of an outlet connection 96. The separated air-hydrocarbon vapor mixture passes from the separator 84 into the absorber 86 by way of the connection therebetween. A conduit 98 is connected to the seal liquid outlet connection 94 of the separator 84 and to the seal liquid inlet connection 78 of the pump 72. A cooler 100 is disposed in the conduit 98 for cooling the seal liquid as it flows therethrough. In certain applications, a seal liquid circulation pump can also be disposed in the conduit 98 between the separator 84 and the cooler 100. While the cooler 100 can be of various types and designs, a heat exchanger which cools the seal liquid by passing it in heat exchange relationship with a stream of lean liquid absorbent is preferred and generally is the most economical.

A conduit 102 is connected to the connection 96 of the separator 84 and to a rich liquid absorbent-condensed hydrocarbon liquids pump 104. The discharge connection of the pump 104 is connected to a conduit 106 which can lead the rich liquid absorbent-condensed hydrocarbon liquids mixture to a storage facility (not shown) or to the heat transfer coils 21 and 23 disposed in the adsorbers 12 and 14 as will be described further hereinbelow.

The absorber 86 includes means disposed therein for bringing about intimate contact between a liquid absorbent flowing downwardly therein and a vapor mixture flowing upwardly therein. Such means can be comprised of vapor-liquid contact trays or any of a variety of conventional packing materials. Preferably, the absorber 86 includes a section of packing material 108 disposed in the top portion thereof for bringing about such intimate contact. A residue gas outlet connection 110 and a lean liquid absorbent inlet connection 112 are provided above the packed section 108. As described above, in the embodiment shown in the drawing, the open bottom of the absorber 86 is sealingly connected to the top of the separator 84 over an opening in the separator 84 whereby rich liquid absorbent produced in the absorber 86 flows downwardly out of the absorber and into the separator 84. In a like manner, the mixture of air and hydrocarbons separated in the separator 84 flows upwardly through the open bottom of the absorber 86 into contact with the liquid absorbent flowing downwardly therein whereby hydrocarbons are absorbed and removed from the vapor mixture and a residue gas stream comprised of air and a minor portion of hydrocarbons is produced.

A conduit 114 is connected to the lean liquid absorbent inlet 112 of the absorber 86 and to the discharge connection of a lean liquid absorbent pump 116. A conduit 118 is connected to the suction connection of the pump 116 which leads a stream of lean liquid absorbent from a source thereof, such as a storage tank, to the pump 116. As indicated above, a conduit 126 is provided connecting the conduit 114 with the cooler 100 whereby a side stream of lean liquid absorbent flows through the cooler 100. A conduit 128 leads the side stream of lean liquid absorbent from the cooler 100 to an inlet connection 132 on the separator 84, or alternatively, to a second lean liquid absorbent inlet connection (not shown) on the absorber 86 positioned below the inlet connection 112.

In certain applications, the lean liquid absorbent may be too warm to use directly as an absorbent and seal liquid coolant. In such applications, a cooler (not shown) can be disposed in the conduit 114 upstream of the connection thereof to the conduit 126. The residue gas stream produced in the absorber 86 exits the absorber by way of the connection 110 thereof and flows by way of a conduit 120 to the inlet air-hydrocarbon vapor header 24.

A cooling medium inlet header 130 is provided connected to the inlet connections 25 and 27 of the heat transfer coils 21 and 23 disposed in the adsorbers 12 and 14. A conduit 132 is connected to the header 130 and to a source of cooling medium. An outlet header 134 is provided connected to the outlet connections 29 and 31 of the heat transfer coils 21 and 23. A conduit 136 is connected to the header 134 for conducting cooling medium from the header 134. As will be understood by those skilled in the art, a variety of cooling media can be utilized to cool the adsorbent beds, such as cooling water or other available process stream having a low enough temperature to effect the cooling. The cooling medium utilized is circulated through the heat transfer coils 21 and 23, as for instance by pumping the cooling medium from a source thereof through the heat transfer coils 21 and 23 and returning the cooling medium to the source. If the cooling medium is circulated through the heat transfer coils in a closed circuit, a cooler can be utilized to remove the heat therefrom.

If a separate cooling medium is flowed through the heat transfer coils 21 and 23, the rich liquid absorbent-condensed hydrocarbon stream exiting the apparatus 10 by way of the conduit 106 is conducted to a storage facility. However, in a preferred embodiment of the present invention, the conduit 106 is connected to the cooling medium inlet conduit 132 by a conduit 140 (shown in dashed lines) whereby the rich liquid absorbent-condensed hydrocarbon stream flows from the pump 104 through the conduits 106, 140 and 132 into the inlet header 130. From the inlet header 130, the stream divides and equal portions pass through the heat transfer coils 21 and 23. The rich liquid absorbent-condensed hydrocarbon mixture exits the heat transfer coils and is combined in the outlet header 134. From the outlet header 134, the mixture is conducted to a storage facility. Thus, the rich liquid absorbent-condensed hydrocarbon mixture is continuously flowed through the heat transfer coils 21 and 23 whereby the beds of adsorbent contained in the adsorbers 12 and 14 are continuously cooled. However, both in the case where the rich liquid absorbent-condensed hydrocarbon mixture or a separate cooling medium are utilized and if required by design considerations, switching valves can be disposed in the headers 130 and 134 and operated in a manner whereby the rich liquid absorbent-condensed hydrocarbon mixture or other cooling medium is caused to flow through the heat transfer coils 21 and 23 only when the inlet air-hydrocarbon vapor mixture is flowing through the adsorber in which the heat transfer coil is disposed whereby the bed of adsorbent is prevented from overheating.

As will be understood by those skilled in the art, the switching valves 32, 34, 38, 40, 50, 52 and 66 can be operated manually, but are preferably automatically operated valves which are controlled by a conventional cycle controller. The length of the cycle, i.e., the period of time between when the switching valves are operated, can be controlled by a timer or other instrument sensing one or more variables in the operation of the apparatus 10, such as the degree of vacuum achieved in the adsorbent bed being regenerated, the composition of the gas stream being vented to the atmosphere, etc. If switching valves are included in the cooling medium inlet and outlet headers 130 and 134 to switch the flow of cooling medium from one of the heat transfer coils disposed in the adsorbers 12 and 14 to another as described above, such switching valves can be controlled by the cycle controller or they can be controlled by a conventional instrument sensing the temperature of the residue gas exiting the adsorbers or the temperature of the bed of adsorbent through which the inlet air-hydrocarbon vapor mixture is flowing.

OPERATION OF THE APPARATUS 10

In operation of the apparatus 10, the switching valves 32, 34, 38, 40, 50 and 52 are operated in a manner whereby the inlet air-hydrocarbon vapor mixture is caused to flow through one of the adsorbers 12 and 14 while the other of the adsorbers is being regenerated. For example, during a first cycle, the switching valve 32 is open and the switching valve 34 closed whereby the inlet air-hydrocarbon vapor mixture flows into the adsorber 12 by way of the conduit 28, switching valve 32 and connection 16 of the adsorber 12. Because the switching valve 34 disposed in the conduit 30 is closed, the inlet air-hydrocarbon vapor mixture is prevented from entering the adsorber 14. The switching valve 50 disposed in the conduit 46 is open and the switching valve 52 disposed in the conduit 48 is closed whereby the residue gas stream produced in the adsorber 12 exits the adsorber 12 by way of the connection 18 thereof, the conduit 46 and the switching valve 50 and enters the header 44. From the header 44, the residue gas stream flows through the conduit 54 from where it is vented to the atmosphere. The switching valve 38 disposed in the header 36 is closed and the switching valve 40 disposed therein is open whereby the adsorbent bed within the adsorber 14 is communicated with the suction connection 74 of the vacuum pump 72 by way of the connection 20 of the adsorber 14, the header 36, the open switching valve 40, and the conduit 42. The switching valve 66 disposed in the conduit 62 is initially closed.

During the first part of the cycle when the switching valves are in the mode described above, the inlet air-hydrocarbon vapor mixture flows through the bed of adsorbent within the adsorber 12 so that hydrocarbons are adsorbed on the bed and removed from the mixture. The residue gas produced which is comprised of substantially hydrocarbon-free air is vented to the atmosphere by way of the air vent 54. Simultaneously, the bed of adsorbent disposed within the adsorber 14 is evacuated by the liquid seal vacuum pump whereby hydrocarbons are desorbed therefrom. A hydrocarbon-rich air-hydrocarbon vapor mixture is withdrawn from the adsorbent bed within the adsorber 14 which flows through the vacuum pump 72. Cooled seal liquid, preferably water or a mixture of water and a substance which functions as an antifreeze agent in the winter and as an agent to lower seal fluid vapor pressure in the summer, e.g., ethylene glycol, flows into the vacuum pump 72 by way of the connection 78 thereof and is discharged by way of the discharge connection 76 with the air-hydrocarbon vapor mixture. The intimate contact of the air-hydrocarbon vapor mixture with the cool seal liquid while flowing through the vacuum pump 72 cools the vapor mixture and causes heavy hydrocarbons contained therein to be condensed. Thus, a stream of hydrocarbon-rich air-hydrocarbon vapor mixture containing both seal liquid and condensed hydrocarbon liquids exits the pump 72 and flows through the conduit 80 into the separator 84. While passing through the separator 84, the air-hydrocarbon vapor mixture, seal liquid and condensed hydrocarbon liquids are separated from each other. As previously described, the separated seal liquid flows from the separator 84 by way of the connection 94 thereof, the conduit 98 and the cooler 100 back into the vacuum pump 72. Thus, the seal liquid is continually circulated between the pump 72, the separator 84 and the cooler 100 while the pump 72 is operating.

The separated condensed hydrocarbon liquids spill over the weir 88 and flow into the compartment 92 of the separator 84 where they combine with rich liquid absorbent flowing into the compartment 92 from the absorber 86 and are removed therefrom by way of the connection 96 thereof, the conduit 102 and the pump 104.

A first stream or portion of lean liquid absorbent is pumped from a source thereof by the pump 116 to the cooler 100 by way of the conduit 126. The resultant heated first portion is conducted from the cooler 100 to the separator 84 by the conduit 128.

A second stream or portion of the lean liquid absorbent is pumped from the source thereof by the pump 116 and flows by way of the conduit 114 and connection 112 into the absorber 86. The lean liquid absorbent flows downwardly within the absorber 86 through the packed section 108 thereof and intimately contacts the separated air-hydrocarbon mixture flowing upwardly therethrough from the separator 84. As the air-hydrocarbon vapor mixture is contacted by the liquid absorbent, hydrocarbons are absorbed by the liquid absorbent and removed from the vapor mixture so that a residue gas stream comprised of air and a minor portion of hydrocarbons is produced. The residue gas stream exits the absorber 86 by way of the connection 100 thereof and flows by way of the conduit 120 into the header 24 where it combines with the inlet air-hydrocarbon vapor mixture and flows through the adsorber 12. As will be understood, the hydrocarbons contained in the residue gas stream are adsorbed on the bed of adsorbent within the adsorber 12 along with hydrocarbons from the inlet air-hydrocarbon vapor mixture.

During a latter part of the cycle, after a major portion of hydrocarbons adsorbed on the bed of adsorbent within the adsorber 14 have been desorbed therefrom by the operation of the vacuum pump 72, i.e., the initial evacuation of the adsorber 14, the switching valve 66 in the conduit 62 is opened whereby a relatively small quantity of hydrocarbon-free air from the atmosphere enters the conduit 62, flows through the heater 64 so that it is heated and then flows by way of the header 56, the check valve 60 and the connection 22 of the adsorber 14 into the adsorber 14. The heated hydrocarbon-free air flows through the bed of adsorbent contained in the adsorber 14 and is withdrawn therefrom by the vacuum pump 72 as previously described. The introduction of a quantity of heated hydrocarbon-free air into the adsorbent bed contained within the adsorber 14 functions to strip additional hydrocarbons from the bed which were not desorbed therefrom by vacuum pumping, i.e., by the lowering of the pressure exerted on the bed to the degree of vacuum achieved by the vacuum pump 72. Although the apparatus is shown in the drawing to include the heater 64, this element is optional. To achieve the same efficiency without heating the stripping air as can be achieved by heating the stripping air, a slightly greater volume of stripping air at ambient temperature should be introduced into the apparatus.

Thus, as will be apparent, the combination of initially evacuating the adsorber 14 by vacuum pumping and stripping the adsorbent bed with hydrocarbon-free air brings about the regeneration of the bed to a greater degree than is possible by vacuum pumping alone. This more complete regeneration of the bed increases the capacity of the bed to adsorb additional hydrocarbons, increases the overall efficiency of the apparatus 10 and increases the service life of the adsorbent.

After the adsorbent bed within the adsorber 14 has been fully regenerated and the adsorbent bed within the adsorber 12 loaded with hydrocarbons from the air-hydrocarbon vapor mixture flowing therethrough, the switching valve 66 is closed and the switching valves 32 and 50 are closed, the switching valves 34 and 52 are opened, the switching valve 38 is opened and the switching valve 40 is closed. This causes the flow pattern of the inlet air-hydrocarbon vapor mixture to be changed so that the mixture flows through the regenerated adsorbent bed within the adsorber 14 and the residue gas therefrom is vented to the atmosphere. The adsorbent bed within the adsorber 12 is simultaneously communicated with the vacuum pump 72 whereby it is evacuated and the switching valve 66 is opened during a latter part of the cycle as described above to strip the adsorbent bed within the adsorber 12 and further evacuate the adsorbent bed so that additional hydrocarbons are desorbed therefrom.

As will be understood by those skilled in the art, the flow pattern of the inlet air-hydrocarbon vapor mixture and the bed being regenerated are continuously changed or cycled so that when the adsorbent bed through which the inlet vapor mixture is flowing becomes loaded with adsorbed hydrocarbons, the inlet mixture is caused to flow into the bed which has just been regenerated. The hydrocarbon rich air-hydrocarbon mixture produced from the bed being regenerated is continuously contacted with liquid absorbent in the absorber 86 so that the hydrocarbons are recovered.

In the embodiment shown in the drawing, the rich liquid absorbent-condensed hydrocarbon mixture pumped from the separator 84 by the pump 104 is conducted by the conduits 106, 140 and 132 to the cooling medium inlet header 130. From the header 130, equal portions of the mixture are caused to flow through the heat transfer coils 21 and 23 disposed in the beds of solid adsorbent within the adsorbers 12 and 14 thereby cooling the beds of adsorbent and preventing the overheating thereof due to exothermic reactions taking place therein and/or therewith. The mixture exits the transfer coils 21 and 23 by way of the cooling medium outlet header 134 and is withdrawn therefrom by the conduit 136 which conducts the mixture to storage facilities. Alternatively, as indicated above, the conduit 106 can lead the rich liquid absorbent-condensed hydrocarbon mixture directly to storage facilities and a separate cooling medium such as cooling water, etc., can be conducted to the heat transfer coils 21 and 23 by way of the conduit 132 and cooling medium inlet header 130. The heated cooling medium is withdrawn from the heat transfer coils 21 and 23 by the cooling medium outlet header 134 and the conduit 136.

It has been found that if the beds of solid adsorbent are maintained at a temperature below about 150° F. during the operation of the apparatus 10, overheating of the beds is prevented. That is, by cooling the beds of solid adsorbent and maintaining the temperature thereof below about 150° F., the heat released by exothermic reactions taking place in the beds and the heat of adsorption liberated as hydrocarbons are adsorbed on the beds is removed therefrom and acclerated, exothermic reactions resulting in the runaway heating of the beds is prevented.

The apparatus 10 is particularly suitable for recovering vaporized gasoline light ends mixed with air produced as a result of loading gasoline into tank trucks and other vessels. In this application the air-gasoline vapor mixture is processed in the apparatus 10 as described above and the liquid absorbent utilized is gasoline. That is, stored gasoline is pumped from a storage facility into the absorber 86 and the rich gasoline and condensed hydrocarbon liquids produced by the apparatus 10 are returned to the gasoline storage facility. Because the stored gasoline is continuously being loaded out of the storage facilities and replaced by newly produced gasoline, the stream of gasoline pumped to the absorber is lean enough to efficiently absorb gasoline light ends. Preferably, the lean gasoline is withdrawn from a separate storage tank from that to which the rich liquid absorbent-condensed hydrocarbon mixture is conducted to insure the efficient absorption of the vaporized hydrocarbon light ends in the absorber 86.

In order to more clearly illustrate the operation of the apparatus 10, the following example is given.

EXAMPLE

A typical gasoline truck loading terminal has the following loading pattern:
Maximum Instantaneous Rate: 2200 gallons/minute
Maximum Throughput in 15 Minutes: 16500 gallons
Maximum Throughput in 1 Hour: 48000 gallons
Maximum Throughput in 4 Hours: 168000 gallons
Maximum Throughput Daily: 960000 gallons The gasoline loaded is deemed to have the following properties:
Summer: 10 psia RVP, 75° F. maximum
Winter: 14 psia RVP, 10° F. minimum It is recognized that the hydrocarbon concentration of the air-hydrocarbon vapor generated by loading gasoline into the truck transports will vary according to gasoline volatility and the degree of air saturation attained.

Based on the above gasoline properties and other experience factors known to those skilled in the art, a design hydrocarbon concentration of 35 Vol.% is selected.

The apparatus 10 is designed for an approximately 15 minute cycle time, and consequently, it is necessary to design each adsorption vessel 12 and 14 to handle a net air-hydrocarbon vapor influent from the truck loading rack of 353 cubic feet/minute and 2647 cubic feet each cycle based on a 1.2 vapor growth factor. Approximately 9000 lbs. of the appropriate activated carbon is chosen and distributed equally in two 7 feet in diameter by approximately 8 feet high adsorption vessels 12 and 14. Each of the adsorbers 12 and 14 includes a heat transfer coil 21 and 23 for cooling the activated carbon having 110 square feet of outside surface area.

A liquid ring vacuum pump 72 with a 30-horsepower electric motor is provided for regeneration of the beds of carbon after each adsorption cycle. Very effective regeneration of the carbon beds is accomplished each cycle by the introduction, under high vacuum conditions, of approximately 30 standard cubic feet of air heated to 200° F. to 300° F. The regeneration apparatus provided allows attainment of 49 millimeters of mercury absolute pressure each cycle with the vacuum pump 72.

Concentrated hydrocarbon vapors containing 5 to 20 Vol.% air are discharged from the vacuum pump 72 to a 2 feet diameter by approximately 12 feet high packed absorption column 86 integrally connected to a 3.5 feet diameter by approximately 8 feet long separator 84. A major portion of the hydrocarbon vapors are absorbed and thereby recovered.

The minor portion of hydrocarbon vapors not immediately absorbed into the gasoline absorbent exits the top of the absorber 86. These hydrocarbons flow to whichever adsorber 12 or 14 is in the adsorption mode where they are adsorbed onto the activated carbon. Subsequently, during regeneration of the carbon, they are removed returning to the absorber 86.

The centrifugal pump 104 with a 5-horsepower electric motor circulates 94 gallons/minute of gasoline from storage facilities for purposes of providing the absorption medium in the absorber 86 and to provide the necessary seal fluid cooling medium in the seal fluid cooler 100.

96 gallons/minute of gasoline are withdrawn from the separator 84 and pumped by the pump 116 with a 5-horsepower motor through the heat transfer coils 21 and 23 disposed in the adsorbers 12 and 14 thereby maintaining the beds of activated carbon therein at temperatures below about 150° F. and preventing the runaway overheating thereof.

The apparatus 10 designed as described above can be expected to remove and recover the hydrocarbon vapors generated from the transport loading rack such that less than 10 milligrams of hydrocarbons will be vented to the atmosphere per liter of gasoline loaded.

Thus, the present invention is well adapted to carry out the objects and attain the ends and advantages mentioned as well as those inherent therein. While presently preferred embodiments of the invention have been described for purposes of this disclosure, numerous changes in the arrangement of process steps and apparatus elements will suggest themselves to those skilled in the art, which changes are encompassed within the spirit of this invention as defined by the appended claims.

We claim:

1. A process for recovering hydrocarbons from an inlet air-hydrocarbon vapor mixture comprising the steps of:
    (a) flowing said inlet mixture through a first bed of solid adsorbent having an affinity for hydrocarbons whereby hydrocarbons are adsorbed on said bed and a residue gas stream comprised of substantially hydrocarbon-free air is produced;
    (b) venting said substantially hydrocarbon-free air to the atmosphere;
    (c) evacuating a second bed of solid adsorbent having hydrocarbons adsorbed thereon by vacuum pumping whereby a major portion of said hydrocarbons are desorbed from said bed and a hydrocarbon-rich air-hydrocarbon mixture is produced;
    (d) contacting the air-hydrocarbon mixture produced in step (c) in an absorber with a liquid absorbent having an affinity for hydrocarbons whereby a major portion of the hydrocarbons are removed therefrom and a residue gas stream comprised of air and a minor portion of hydrocarbons is produced;
    (e) combining said residue gas stream produced in step (d) with said inlet air-hydrocarbon mixture of step (a) whereby hydrocarbons contained therein are adsorbed on said first bed of solid adsorbent;
    (f) periodically changing the flow patterns of said inlet air-hydrocarbon mixture and changing the bed of solid adsorbent being evacuated whereby when the bed through which the inlet air-hydrocarbon mixture is flowing becomes loaded with adsorbed hydrocarbons, the inlet air-hydrocarbon mixture is caused to flow through the bed which has just been evacuated; and
    (g) cooling said beds of solid adsorbent to thereby prevent said beds from runaway overheating, the cooling of said beds being accomplished by flowing the liquid absorbent of step (d) through heat transfer coils disposed in said beds of solid adsorbent after contacting said air-hydrocarbon mixture therewith in accordance with step (d).

2. The process of claim 1 which is further characterized to include the step of introducing a quantity of hydrocarbon-free air into said second bed while evacuating said bed whereby additional hydrocarbons are stripped from said bed and additional air-hydrocarbon mixture produced.

3. The process of claim 2 which is further characterized to include the step of cooling the air-hydrocarbon mixture produced in step (c) prior to contacting said mixture with said liquid absorbent.

4. The process of claim 2 wherein said hydrocarbon-free air is heated prior to introducing it into said beds.

5. The process of claim 1 wherein the hydrocarbons contained in said inlet air-hydrocarbon mixture are vaporized gasoline light ends and the liquid absorbent utilized is gasoline.

6. The process of claim 5 wherein said first and second beds of solid adsorbent are beds of activated carbon.

7. A process for recovering hydrocarbons from an inlet air-hydrocarbon mixture comprising the steps of:
  (a) flowing said inlet mixture through a first bed of activated carbon whereby said hydrocarbons in said mixture are adsorbed on said bed and a residue gas stream comprised of substantially hydrocarbon-free air is produced;
  (b) venting said substantially hydrocarbon-free air to the atmosphere;
  (c) evacuating a second bed of activated carbon having hydrocarbons adsorbed thereon by subjecting said bed to pumping with a liquid seal vacuum pump whereby a major portion of said hydrocarbpns are desorbed from said bed and a hydrocarbon-rich air-hydrocarbon vapor mixture containing liquid from said liquid seal vacuum pump and condensed hydrocarbon liquids is produced;
  (d) introducing a quantity of hydrocarbon-free air into said second bed while continuing to evacuate said bed by pumping with said liquid seal vacuum pump whereby additional hydrocarbons are stripped from said bed and additional air-hydrocarbon vapor mixture containing liquids from said liquid seal vacuum pump and condensed hydrocarbon liquids is produced;
  (e) separating the liquid from the liquid seal vacuum pump and the condensed hydrocarbon liquids from each other and from the air-hydrocarbon vapor mixture produced in steps (c) and (d);
  (f) cooling the separated liquid seal vacuum pump liquid;
  (g) recycling the cooled liquid seal vacuum pump liquid to said liquid seal vacuum pump;
  (h) contacting the air-hydrocarbon mixture separated in step (e) in an absorber with a lean liquid absorbent having an affinity for hydrocarbons whereby a major portion of the hydrocarbons are removed therefrom, a hydrocarbon-rich liquid absorbent is produced and a residue gas stream comprised of air and a minor portion of hydrocarbons is produced;
  (i) combining the hydrocarbon liquids separated in step (e) with the hydrocarbon-rich liquid absorbent;
  (j) combining said residue gas stream produced in step (h) with said inlet air-hydrocarbon mixture of step (a) whereby hydrocarbons contained therein are adsorbed on said first bed of solid adsorbent;
  (k) periodically changing the flow pattern of said inlet air-hydrocarbon mixture and changing the bed of activated carbon being evacuated and stripped whereby when the bed through which the inlet air-hydrocarbon mixture is flowing becomes loaded with adsorbed hydrocarbons, the inlet air-hydrocarbon mixture is caused to flow through the bed which has just been evacuated and stripped; and
  (l) flowing said hydrocarbon liquids and hydrocarbon-rich liquid absorbent mixture from step (i) in heat exchange relationship with said beds of solid adsorbent thereby cooling said beds of solid adsorbent at least while said inlet air-hydrocarbon vapor mixture is flowing therethrough to thereby prevent said beds from overheating.

8. The process of claim 7 wherein the step of cooling the liquid seal vacuum pump liquid comprises passing said liquid in heat exchange relationship with a stream of liquid absorbent.

9. The process of claim 8 wherein the hydrocarbons contained in said inlet air-hydrocarbon mixture are vaporized gasoline light ends and the liquid absorbent utilized in step (h) is gasoline.

10. The process of claim 9 wherein the liquid seal vacuum pump liquid is water.

11. The process of claim 9 wherein the liquid seal vacuum pump liquid is a mixture of water and glycol.

12. The process of claim 9 wherein the hydrocarbon-free air utilized in step (d) is heated prior to introducing it into said bed.

13. The process of claim 9 wherein the source of lean gasoline utilized in step (h) is a gasoline storage facility and said mixture of hydrocarbon liquids and hydrocarbon-rich absorbent of step (l) are conducted back to said storage facility.

14. Apparatus for recovering hydrocarbons from air-hydrocarbon vapor mixtures comprising:
  (a) a pair of adsorbers containing beds of solid adsorbent having an affinity for hydrocarbons and having first and second connections on opposite sides of said beds;
  (b) a pair of heat transfer coils, one disposed in each of said adsorbers for cooling the beds of solid adsorbent disposed therein having inlet and outlet connections;
  (c) first conduit means connected to the first connections of said adsorbers for conducting said air-hydrocarbon vapor mixture to said adsorbers and for evacuating said adsorbers;
  (d) valve means disposed in said first conduit means for selectively causing said air-hydrocarbon vapor mixture to flow through one or the other of said adsorbers;
  (e) second conduit means connected to the second connections of said adsorbers for conducting residue gas exiting said adsorbers to the atmosphere;
  (f) second valve means disposed in said second conduit means for selectively causing the second connections of one or the other of said adsorbers to be open to the atmosphere;
  (g) a vacuum pump having a suction connection and a discharge connection;
  (h) third conduit means connected between the suction connection of said vacuum pump and the first conduit means connected to said adsorbers;
  (i) third valve means disposed in said third conduit means for selectively communicating one or the other of said adsorbers with the suction connection of said vacuum pump;
  (j) an absorber for contacting an air-hydrocarbon vapor mixture with a liquid absorbent having an air-hydrocarbon vapor mixture inlet connection, a residue gas outlet connection, a lean liquid absorbent inlet connection and a rich liquid absorbent outlet connection;
  (k) fourth conduit means connected between the air-hydrocarbon vapor mixture inlet of said absorber and the discharge connection of said vacuum pump;
  (l) fifth conduit means connected between the residue gas outlet connection of said absorber and said first conduit means;

(m) a rich liquid absorbent pump having a suction connection and a discharge connection;

(n) sixth conduit means connected between the rich liquid absorbent outlet connection of said absorber and the suction connection of said rich liquid absorbent pump; and (o) seventh conduit means connected between the discharge connection of said rich liquid absorbent pump and the inlet connections of said heat transfer coils.

15. The apparatus of claim 14 which is further characterized to include:

eighth conduit means connected to the lean liquid absorbent inlet connection of said absorber and to a source of lean liquid absorbent;

a lean liquid absorbent pump disposed in said eighth conduit means; and ninth conduit means connected to the outlet connections of said heat transfer coils and to a rich liquid absorbent storage facility.

16. The apparatus of claim 15 which is further characterized to include:

tenth conduit means connected to said second conduit means for conducting air from the atmosphere to said adsorbers by way of said second connections thereof; and fourth valve means disposed in said tenth conduit means for selectively communicating one or the other of said adsorbers with air from the atmosphere.

17. The apparatus of claim 16 which is further characterized to include means for heating air disposed in said tenth conduit means.

18. The apparatus of claim 17 which is further characterized to include means for cooling an air-hydrocarbon vapor mixture disposed in said fourth conduit means.

19. The apparatus of claim 14 wherein said vacuum pump is a liquid seal vacuum pump having a suction connection, a discharge connection and a seal liquid inlet connection and said apparatus is further characterized to include:

a separator for separating an air-hydrocarbon vapor mixture, condensed hydrocarbon liquids and seal liquids from each other and combining rich liquid absorbent with condensed hydrocarbon liquids having an airhydrocarbon vapor-condensed hydrocarbon liquids-seal liquid inlet connection, a rich liquid absorbent inlet connection, a seal liquid outlet connection, a rich liquid absorbent-condensed hydrocarbon liquid outlet connection and an air-hydrocarbon vapor mixture outlet connection, the inlet connection of said separator being connected to said fourth conduit means and the air-hydrocarbon vapor mixture outlet connection thereof being connected to the air-hydrocarbon vapor mixture inlet connection of said absorber;

eleventh conduit means connected between the seal liquid outlet connection of said separator and the seal liquid inlet connection of said liquid seal vacuum pump; means for cooling the seal liquid disposed in said eleventh conduit means; and twelfth conduit means connected between the rich liquid absorbent inlet connection of said separator and the rich liquid absorbent outlet connection of said absorber.

* * * * *